United States Patent
Blythe et al.

(10) Patent No.: US 7,914,381 B2
(45) Date of Patent: Mar. 29, 2011

(54) SYSTEM AND METHOD FOR FACILITATING MULTIPLAYER ONLINE GAMING

(75) Inventors: Garrett Blythe, Cupertino, CA (US); Christopher Kirmse, Sunnyvale, CA (US)

(73) Assignee: Xfire, Inc., Menlo Park, CA (US)

( * ) Notice: Subject to any disclaimer, the term of this patent is extended or adjusted under 35 U.S.C. 154(b) by 925 days.

(21) Appl. No.: 10/802,086

(22) Filed: Mar. 16, 2004

(65) Prior Publication Data

US 2005/0209002 A1 Sep. 22, 2005

(51) Int. Cl.
*A63F 9/24* (2006.01)
*A63F 13/00* (2006.01)
*G06F 17/00* (2006.01)
*G06F 19/00* (2006.01)

(52) U.S. Cl. .......... 463/42; 370/443; 370/352; 709/205; 709/203; 709/213; 709/204; 463/40; 463/35; 463/36; 395/200.66

(58) Field of Classification Search ................... 463/42; 462/42
See application file for complete search history.

(56) References Cited

U.S. PATENT DOCUMENTS

| | | | |
|---|---|---|---|
| 5,774,673 A | 6/1998 | Beuk et al. | |
| 6,664,982 B1 * | 12/2003 | Bi | 715/773 |
| 6,854,012 B1 * | 2/2005 | Taylor | 709/224 |
| 7,240,093 B1 | 7/2007 | Danieli et al. | |
| 2002/0010780 A1 * | 1/2002 | Wong et al. | 709/226 |
| 2002/0086732 A1 | 7/2002 | Kirmse et al. | |
| 2002/0094870 A1 * | 7/2002 | Murray | 463/42 |
| 2002/0138617 A1 * | 9/2002 | Christfort et al. | 709/225 |
| 2003/0038805 A1 * | 2/2003 | Wong et al. | 345/473 |
| 2004/0032876 A1 * | 2/2004 | Garg et al. | 370/443 |
| 2004/0224769 A1 * | 11/2004 | Hansen et al. | 463/40 |

* cited by examiner

*Primary Examiner* — Paul A. D'Agostino
(74) *Attorney, Agent, or Firm* — Cislo & Thomas, LLP

(57) ABSTRACT

A system and method for facilitating multiplayer online gaming is disclosed. The system 100 includes a client gaming program 108 and a gaming layered service provider ("LSP") 114, which are stored and operate on a client computer terminal 120. The client gaming program 108 detects when certain individuals identified by a user are playing online games and notifies the user of the individuals currently playing games online and the games that the individuals are playing. The client gaming program 108 allows the user to easily join the games in progress. The gaming program 108 and LSP 114 also monitor and detect games that are running on the terminal 120 and the connection status of the games. The gaming program 108 communicates data regarding the user, games and connection status over the computer network for receipt by selected individuals.

31 Claims, 5 Drawing Sheets

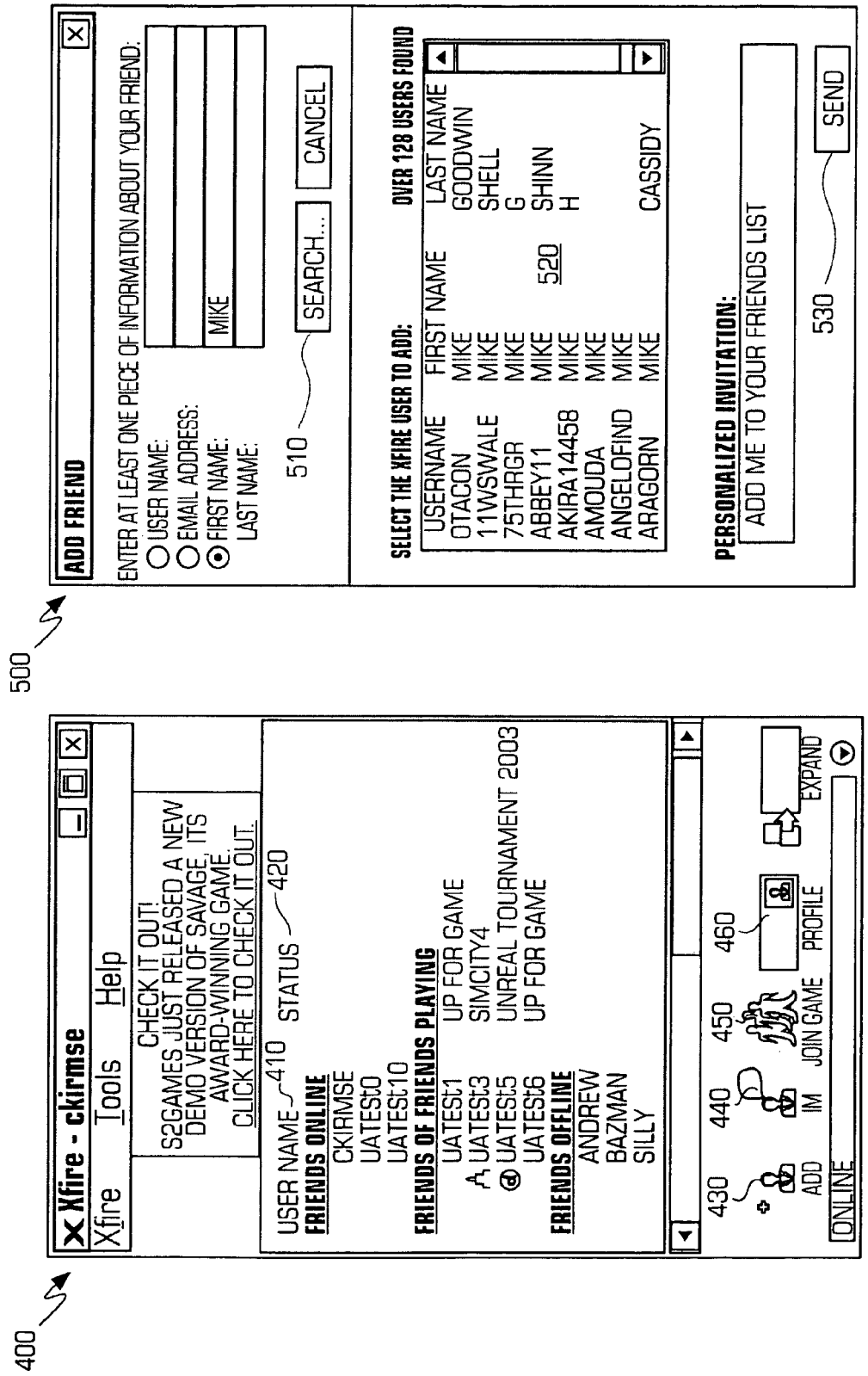

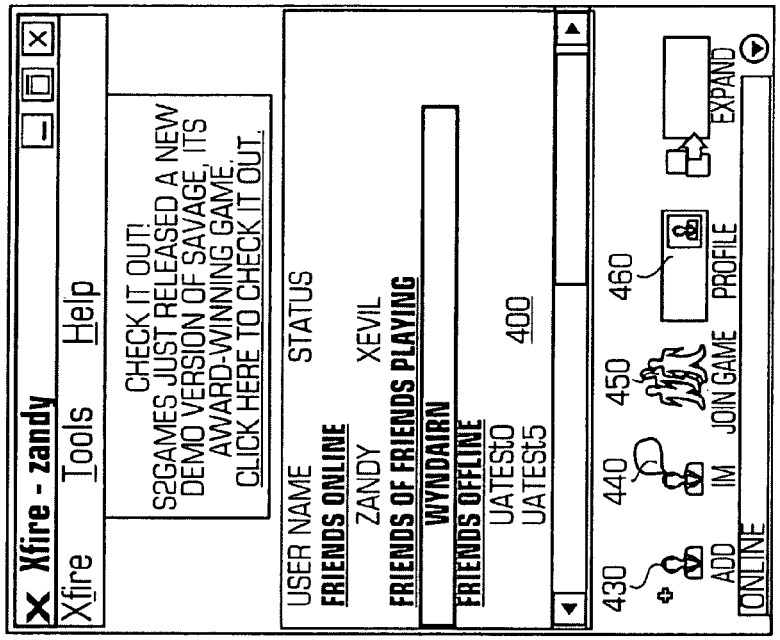
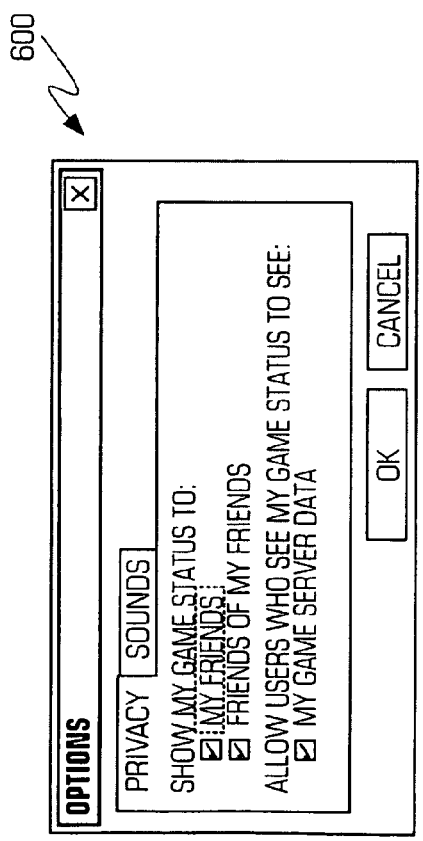
FIG. 6
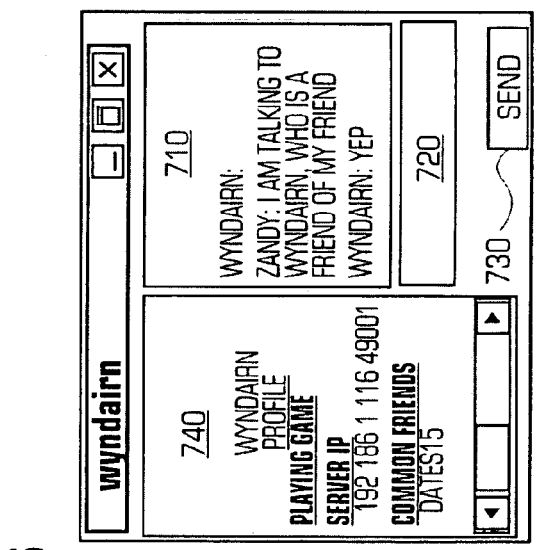
FIG. 7

SYSTEM AND METHOD FOR FACILITATING MULTIPLAYER ONLINE GAMING

FIELD OF THE INVENTION

The present invention generally relates to online gaming systems and more particularly, to a system and method that facilitates online gaming, by monitoring when and where certain individuals are playing computer games online, notifying a user of the individuals currently playing online games, and allowing the user to easily join certain ongoing games.

BACKGROUND OF THE INVENTION

In recent years, online computer gaming has become more popular and prevalent. The Internet has provided individual computer users with venues in which to play computer games with multiple friends or acquaintances located in remote locations. But despite the growth in players, prior art game operators and players face a number of challenges. Currently, players have difficulty monitoring and identifying when friends and acquaintances are playing games that they may want to join. Additionally, even if a player becomes aware that a friend or associate is playing a game, it is difficult for that player to join the game even if they are running supplementary programs.

It would therefore be desirable to provide a system and method for multiplayer online gaming that monitors when and where certain individuals are playing computer games online, notifies a user of the individuals currently playing online games, and allows the user to easily join certain games in progress.

SUMMARY OF THE INVENTION

The present invention provides a system and method for facilitating multiplayer online gaming. The system monitors and detects when certain individuals identified by a user are playing online games. The system notifies the user of the individuals currently playing games online and the games that the individuals are playing, and allows the user to easily join certain games in progress.

One advantage of the invention is that it notifies a user when friends and acquaintances are playing online games and allows the user to easily join the games.

Another advantage of the invention is that it provides a system for multiplayer online gaming that automatically notifies a user's friends and acquaintances when the user is playing an online game.

Another advantage of the invention is that it allows users to send and receive instant messages while playing an online game without interrupting the game.

According to one aspect of the invention, a system is provided for facilitating multiplayer gaming over a computer network. The system includes a client program running on a computer that automatically detects when selected individuals are playing certain multiplayer games on the computer network, and notifies a user of the games and the selected individuals playing the games. The client program may also allow the user to join an individual in a game by running an instance of the game on the computer and connecting the computer to a location hosting the game.

The client program may be further adapted to detect running games on the user terminal and to communicate data identifying the running games and the user over the computer network for receipt by selected individuals. The system may also include a second (e.g., LSP) program that determines a connection status of the running games and communicates the connection status to the client program. The client program may communicate the connection status of the running games over the computer network for receipt by the selected individuals.

According to another aspect of the present invention, a computerized method for facilitating multiplayer games over a computer network is provided. The method may include: detecting when selected individuals are playing certain multiplayer games on the computer network; notifying a user of the games and the selected individuals playing the games; and allowing the user to join an individual in a game by running an instance of the game on a user computer and connecting the user computer to an address hosting the game.

According to another aspect of the invention, a computer-readable medium having computer-executable instructions for performing a method for facilitating multiplayer online gaming is provided. The method includes detecting when selected individuals are playing certain multiplayer games on the computer network; and notifying a user of the games and the selected individuals playing the games. The method may also include allowing the user to join an individual in a game by running an instance of the game on a user computer and connecting the user computer to an address hosting the game.

According to another aspect of the invention, a computerized method for communicating over a computer network is provided. The method includes detecting when first individuals stored on a list associated with a user are present on the computer network; detecting when second individuals stored on a list associated with one or more of the first individuals are present on the computer network; notifying the user that the first and second individuals are present on the computer network; and allowing the user to send and receive instant messages to and from the first and second individuals.

These and other features and advantages of the invention will become apparent by reference to the following specification and by reference to the following drawings.

BRIEF DESCRIPTION OF THE DRAWINGS

FIG. 4 is an example of a graphical user interface that may be generated by the system for displaying selected players and the games that they are currently playing.

FIG. 5 is an example of a graphical user interface that may be generated by the system for adding individuals to a user's friend list.

FIG. 6 is an example of a graphical user interface that may be generated by the system for changing options.

FIG. 7 is an example of a graphical user interface that may be generated by the system for sending instant messages.

DETAILED DESCRIPTION OF THE EMBODIMENTS

The present invention will now be described in detail with reference to the drawings, which are provided as illustrative examples of the invention so as to enable those skilled in the art to practice the invention. Notably, the implementation of certain elements of the present invention can be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

Figure 1:
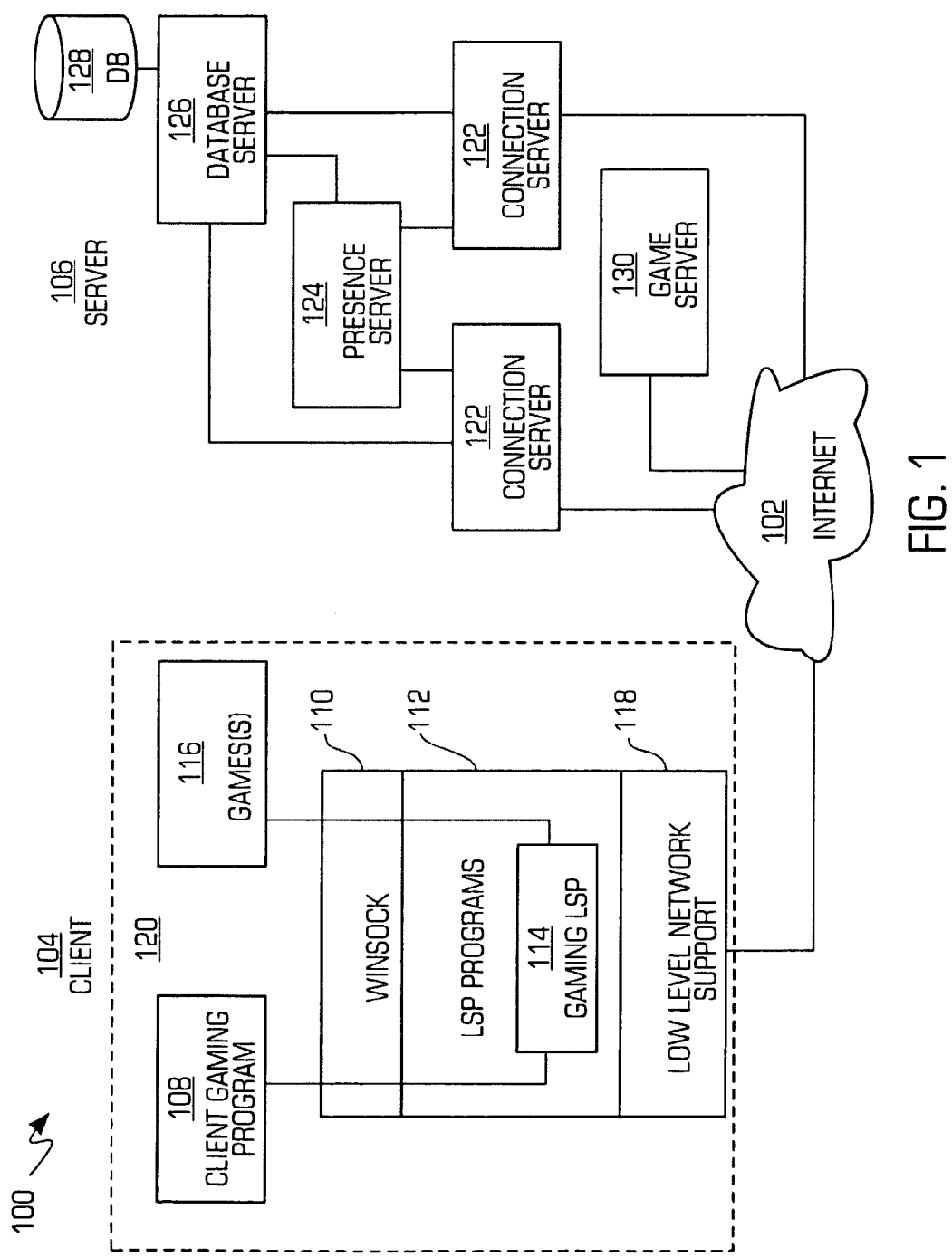
FIG. 1 is a schematic diagram illustrating a system for facilitating multiplayer online gaming according to the present invention.

The present invention provides a system and method for facilitating multiplayer online gaming. FIG. 1 illustrates one embodiment of a system 100 for facilitating multiplayer online gaming, according to the present invention. System 100 is preferably implemented over a computer network 102 (e.g., the Internet), which connects client elements 104 to server elements 106. The client elements 104 may be installed and run on a user's computer terminal 120 and include a client gaming program 108, a Internet programming interface and support program 110, layered service provider ("LSP") programs 112 including a gaming LSP 114, one or more multi-player online computer games 116 and low level network support programs 118, such as TCP/IP layers. The server elements 106 may include one or more connection servers 122, a presence server 124, a database server 126, a database 128 and a game server 130.

The user computer terminal 120 may be a conventional microprocessor-based computer system including hardware and software components adapted to run multiplayer online computer games 116 and communicate over computer network 102. For example, the computer terminal 120 may include a control and memory unit, user input devices, a visual display or monitor, and a communications unit. The control and memory unit may contain one or more microprocessors, volatile and non-volatile memory, and one or more persistent storage devices. In the preferred embodiment, the control and memory unit stores at least a portion of the operating software that directs the operation of system 100. User input devices may include one or more conventional and commercially available devices adapted to allow a user to enter data into and receive data from the computer terminal 120 and to play computer games. The user input devices may include a keyboard, mouse, joystick, and the like. The visual display may be a conventional and commercially available device for allowing the computer terminal 120 to display visual data to a user, such as a computer monitor, a flat panel display or other conventional display device. Communications unit may be a suitable and commercially available device or a combination of devices for transferring data over communications network 102 (e.g., the Internet). It should be appreciated that user input device, display and communications unit cooperatively permit a user or operator to play games with other individuals over the computer network 102.

In one embodiment, computer terminal 120 is running a Windows™-based operating system. Client gaming program 108 is preferably a Windows-based program that is stored and operating on the computer terminal 120. The client gaming program 108 allows the user to send and receive information, join online games, and communicate with other individuals over the network 102. In one embodiment, the client gaming program 108 is adapted to perform several functions. First, the client program 108 opens a TCP/IP connection to a connection server 122. The client gaming program 108 also searches the operating system of the user computer terminal 120 for a predetermined list of games and notifies the connection server of the games the user is running. The client gaming program 108 communicates with the gaming LSP 114 to determine the IP addresses to which the games 116 are connected. The client gaming program 108 sends this information to the connection servers 122, which share the data with other players (i.e., with other instances of the client gaming program). The client gaming program 108 maintains this information and allows a user to easily join friends and/or friends of friends in an online game by automatically running the game instance 116 and connecting it to the corresponding network address (i.e., the address hosting the online game). The operation of client gaming program 108 is described in greater detail below relative to FIG. 2.

In one embodiment, the Internet programming interface and support program 110 includes Winsock. Winsock 110 handles input/output requests for Internet applications. The LSPs 112 may include conventional layered service provider programs that plug into Winsock. Gaming LSP 114 is mapped into all of the system processes. In this manner, the LSP 114 can detect and monitor when a user is connected to a remote gaming server and will provide the information (e.g., the connection address) to the client gaming program 108. Low level network support programs 118 are conventional programs for network communication such as TCP/IP layers.

In one embodiment, the connection servers 122 may include Linux applications that may be running on one or more conventional server machines. The connection servers 122 receive connections from clients 104. The connection servers 122 forward some requests to the database server 126 and some to the presence server 124. In one embodiment, the connection severs 122 send the database server 126 all requests that can be handled through retrieving data from or storing data to the database 128, such as getting a list of a user's friends, verifying a user's password, adding a friend to a friend list, deleting a friend from a friend list, or searching for a user. The connection servers 122 may send communications to the presence server 124, such as transmissions involved in logging in, sending an instant message, or saving a user's preferences. The connection servers 122 also receive messages from the database server 126 and presence server 124 and forward the messages to clients 104. In the preferred embodiment, the database server 126 sends back one response to each message sent by the connection server 122 indicating success or failure of the request, and the associated data. The presence server 124 can generate many messages in response to each message from a connection server 122. For example, when one user enters a game, a message (e.g., identifying the user, game and connection address) may be sent from the client gaming program 108 to a connection server 122, which forwards the message to the presence server 124. The presence server 124 may then send the message to the connection servers 122 for each of the user's friends (and all of their friends if the "friends of friends" option is selected). The connection servers 122 forward the message to each of those users' client gaming program 108. In this manner, each client gaming program 108 has the information needed to inform a user of which friends are currently playing online games, and to connect the user to such games if desired (e.g., by running the game instance and connecting to the corresponding connection address). Other messages from the connection server 122 might only generate one message from the presence server 124, such as when a user is sending an instant message to another user.

In one embodiment, the presence server 124 may include a Linux application running on a conventional server machine.

The presence server 124 receives messages from the connection servers 122 and routes the messages back to clients 104. Each user is assigned a unique number upon successfully logging into the system, and the connection servers 122 and the presence server 124 store a mapping between users and their current unique numbers. These unique numbers are used by the presence server 124 to determine which connection server 122 to send a message to forward to any given user. The database server 126 may include a Linux application running on a conventional server machine. The database server 126 communicates with the connection servers 122 and presence server 124 to provide information from the database 128. The database 128 may be a conventional relational database that stores account names, passwords, friend lists, profiles or information about the users, and the like. The game server 130 may be a conventional game server for handling communication of data in interactive online games. Some games 116 that a user may run will connect to an Internet game server 130 in order to play the game with other users over a network.

In one embodiment, the client gaming program 108 also functions as an instant messaging client, allowing users to send instant messages to other users through our servers 122 and 124. Particularly, the client gaming program 108, connection server 122, and presence server 124 together can be used to send text messages between different users running the client gaming program 108. This is commonly known as instant messaging, or IM. Users may send messages to any of their friends that are displayed by their client gaming program 108. When a user sends an IM to a friend, the friend will be forwarded the text message through the connection servers 122 and the presence server 124 by use of the mapping. While the present embodiment sends messages through the connection servers 122 to the recipient, in alternate embodiment, instant messages may be sent directly from the sender to the receiver (e.g., bypassing the connection servers). Upon receipt, the message will be displayed immediately on the friend's computer. Users may also send messages to any friends of their friends that are also displayed by the client gaming program 108 (see e.g., description of FIG. 7 below), and the message will be delivered similarly.

In the preferred embodiment, each user of the system is assigned an account or user name and a password, which are stored in the database 128. Each user can create and modify a list of "friends" that is stored in the database 128. A "friend" is defined as an individual that a user desires to share online and/or gaming status with and that is stored on the user's friend list. When a user is online or playing a game, the user's status (i.e., whether the user is online, what if any game the user is playing, and/or if the user currently desires to play a game) may be communicated to every individual on that user's friend list. Likewise, the status of all of the user's friends may be transmitted to the user. In one embodiment, a user can also select to share status information with "friends of friends." A "friend of a friend" is an individual that is not on the user's friend list, but is on a friend list of one or more of the user's friends.

In operation, the client gaming program 108 and gaming LSP 114 operate together to monitor the online and game status of the various users of the system and to share status information among groups of designated individuals. In this manner, the system 100 notifies users of the online and game status of designated individuals and allows users to easily join the individuals in online games (e.g., through selecting an item in a graphical user interface). In one embodiment, the client gaming program 108 determines which games are presently running on a client computer 120 (FIG. 2), and the LSP program 114 determines the connection status of the games (FIG. 3).

Figure 2:
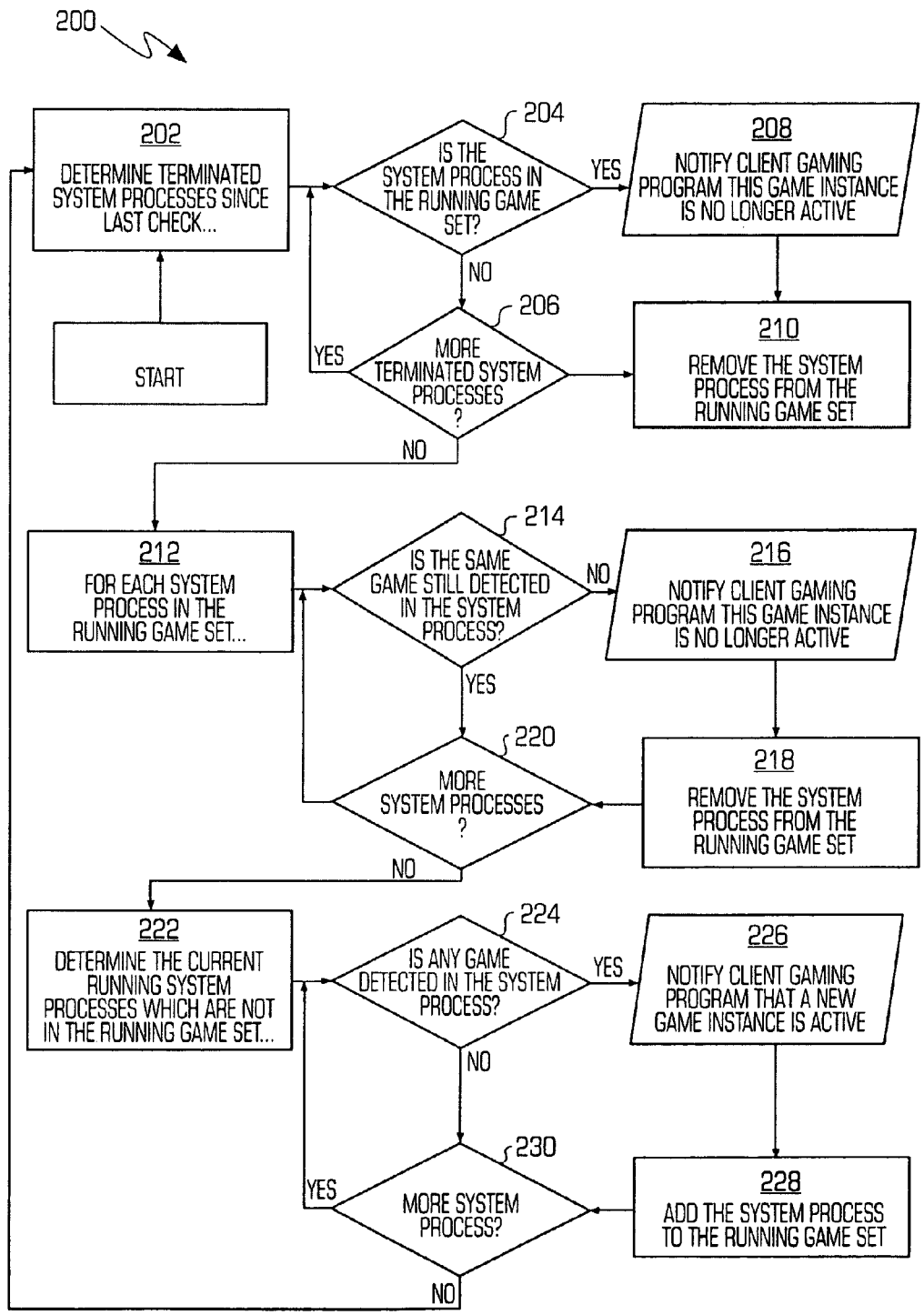
FIG. 2 is a flow chart illustrating a method performed by the system shown in FIG. 1 for determining which game instances are currently running on a client computer.

FIG. 2 illustrates one embodiment of a method 200 that an application, which may be running in the client gaming program 108, may perform to determine which games are presently running on a client computer 120. The method begins at step 202, where the application determines which system processes have terminated since the last iteration of the method 200. In step 204, the application looks at the first of the terminated processes and compares it to a current list of running games or the "running game set." If the process is not in the running game set, the application proceeds to step 206 and determines whether there are additional terminated system processes. If there are no additional terminated system processes, the application proceeds to step 212. Otherwise, the application repeats step 204. If the application determines in step 204 that the system process is in the running game set, the application proceeds to step 208. In step 208, the application notifies the client gaming program 108 that the game associated with the process is no longer active, and in step 210, the client gaming program 108 removes the process from the running game set.

In steps 212-220, the application looks at each system process in the running game set and determines whether the same game is still detected in the system process. Steps 212-220 allow the system to compensate for system processes that may run multiple games. In step 214, the application determines whether the same game is active in the system process. If the same game is not active, the application notifies the client gaming program 108 in step 216, and the program 108 removes the system process from the running game set in step 218. In step 220, the application determines whether there are any additional system processes to analyze and repeats steps 214-220 if additional processes exist. After all system processes are reviewed, the application proceeds to steps 222-230, where it reviews all running processes for game instances that are not in the running game set. In step 222, the process determines all running system processes. In step 224, the process reviews the first running system process to determine if there is any game instance detected in the process. If there is a game instance in the process, the application notifies the client gaming program 108 of the new active game instance in block 226. In step 228, the client gaming program 108 adds the system process to the running game set. If in step 224, there is no game detected in the system process, the application proceeds to the step 230. If there are no other running processes to review, the method 200 restarts. The method may restart either immediately, after a predetermined period of time, or after a predetermined event. If there are other running processes to review, the application repeats steps 224-230. In this manner, method 200 provides the client gaming program 108 with a complete and current running game set. The client gaming program 108 communicates this running game set to the gaming LSP 114.

Figure 3:
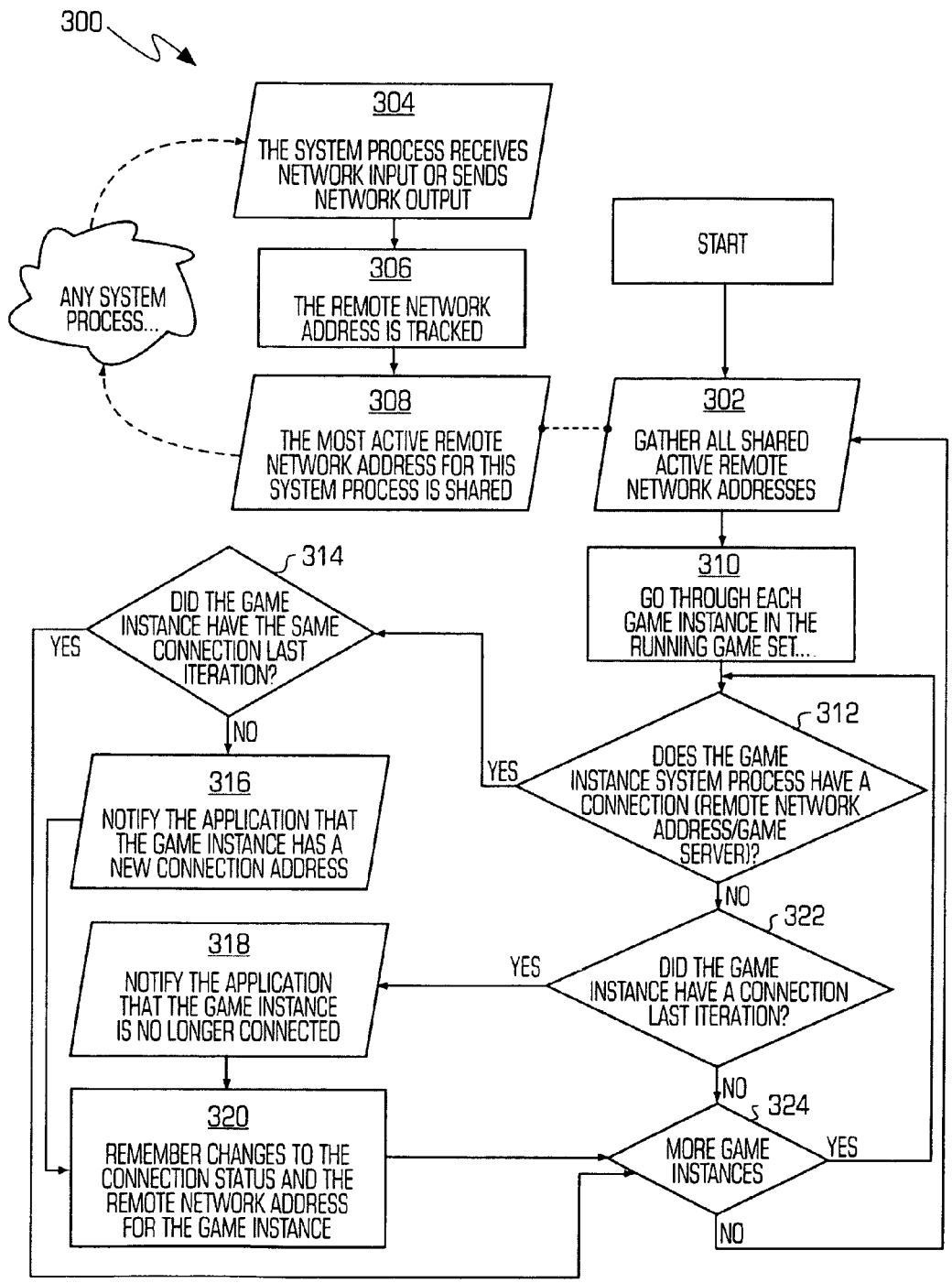
FIG. 3 is a flow chart illustrating a method performed by the system shown in FIG. 1 for determining the connection status and network address of any active game instances.

FIG. 3 illustrates one embodiment of a method 300 that the gaming LSP 114 may performs to determine the connection status of the games that are running on a client computer 120, e.g., whether the games are connected online and the network addresses to which the games are connected. The LSP 114 communicates this information to the client gaming program 108. The client gaming program 108 then communicates the information to the connection servers 122, which, in turn, communicate the information to anyone that is listed as a "friend" (or a "friend of a friend") of the user. In step 302, the LSP determines all active remote network addresses that the client computer 120 is connected to. The LSP can determine this in the manner shown in steps 304-308. In step 304, the LSP, which is mapped to all system processes, detects when any system process receives network input or sends network output. In step 306, the LSP tracks the remote network address that the process receives input from or sends output to. In step 308, the LSP records the most active remote network address for each system process.

In steps 310-324, the LSP goes through each game instance recorded in the running game set to determine the current network connection status for each game. In step 312, the LSP determines whether the game instance in the running game set is connected to a remote game server. If the game instance does have a network connection, the LSP proceeds to step 314. In step 314, the LSP determines if the game instance is connected to the same network address as it was during the previous iteration of method 300. If the game instance is connected to the same network address, the LSP proceeds to step 324 and repeats steps 312-324 for any additional game instances in the running game set. If no additional game instances exist in the running game set, the method 300 restarts. If in step 314, the game instance does not have the same network connection, the LSP proceeds to step 316 and notifies the client gaming program 108 that the game instance has a new connection address. In step 320, the client gaming program 108 stores all changes to the connection status including the remote network address for the game instance. If in step 312, the LSP determines that the game instance does not have a network connection, the LSP proceeds to step 322. In step 322, the LSP determines whether the game instance had a network connection during the last iteration of method 300. If it did not, the LSP proceeds to step 324. If the game instance did have a network connection, the LSP proceeds to step 318 and notifies the client gaming program 108 that the game instance is no longer connected. The client gaming program 108 communicates all changes to the connection status and the remote network address for the game instances to the connection servers 122, which in turn, communicate these changes to the appropriate users (e.g., "friends" and "friends of friends" of the user). In this manner, all users connected to the network receive current information as to their friends who are online and the games that they are playing. This information may be displayed to the user by way of a conventional graphical user interface.

In the preferred embodiment, the client gaming program 108 provides a main graphical user interface that allows users to view selected individuals (e.g., friends and friends of friends) that are currently playing online games and to allow a user to easily join the games. FIG. 4 is an example of a main graphical user interface 400 that may be generated by the client gaming program 108. A user may access the main graphical user interface 400 by selecting an icon appearing on the user's desktop. As shown, interface 400 includes a username column 410, which displays the screen names or usernames of players, and a status column 420, which displays the names of games that the players are currently playing. The username column 410 includes entries for "friends," which are individuals designated as friends by the user and "friends of friends," which are individuals designated as friends by the friends of the user. The name of the game that the individual is playing is provided adjacent to the user name in the status column 420. The user name column 410 also includes "Friends Offline" entries, which represent friends of the user who are not currently playing any online games. In one embodiment, the system tracks when a user is playing games offline (e.g., through method 200) and communicates this information to the other users so that other users can invite the user to play the game in an online multiplayer environment. The system may also allow online users to indicate that they would like to play a game together with another friend or user. If a user selects this option, the phrase "Up For Game" will appear in the status column 420 next to the player's username.

The main graphical user interface 400 may also include an "add" friend icon 430, an "IM" icon 440, a "join game" icon 450 and a "profile" icon 460. When a user selects the join game icon 450, the client gaming program 108 allows the user to join the selected individual in the selected game by automatically running an instance of the game on the user's terminal and connecting the terminal to the IP address hosting the game. The profile icon 460 allows a user to enter miscellaneous information regarding the user. The add friend icon 430 can be selected by a user in order to add one or more friends or to the user's friend list, and to modify the user's friend list. In one embodiment, when the add icon 430 is selected, the system generates an add friend graphical user interface. FIG. 5 is an example of a graphical user interface 500 that may be generated by the client gaming program 108 for adding individuals to a friend list. As shown, the interface 500 includes entries where a user can enter a username, email address, first name, and last name. By entering information into these entries, a user can search the entire system for players who correspond to the information. For example, by entering the first name of "Mike" and selecting the search button 510, the client gaming program 108 will communicate with a connection server 122. The connection server 122 will communicate with the database and retrieve all players who have the first name of "Mike". This list of players will then be communicated to the client gaming program 108, which will display the players in the area 520. A user may then scroll down the list until he finds the player that he wants to add. By selecting that player, the system will automatically add the player the user's friend list. The user may also send an invitation to the player to add the user to the player's friend list. The user may send the invitation through IM by selecting button 530. The IM may be sent in the manner described above. In another embodiment, the user can also send the invitation through email. In order to send an e-mail, the client gaming program 108 may open a web browser to a page that will send an email from the system in a conventional manner.

FIG. 7 is an example showing a graphical user interface 700 that may be generated by the client gaming program 108 for sending instant messages. Unlike prior IM systems, the user interface 700 lists not only friends, but also friends of friends. In the example shown in FIG. 7, the user has selected an individual ("wyndairn") who is listed as a friend of a friend in screen 400. After highlighting the individual's name, the user then selects the IM icon 440. In response, the client gaming program 108 generates user interface 700. As shown, the interface 700 includes a message history area 710 that displays several past messages that were sent by the individuals and a message drafting area 720 in which a user can draft messages. After drafting a message in area 720, a user can send the message by selecting send button 730. The interface 700 may also include an information area 740 that contains various information regarding the individual with whom the user is chatting. For example, the information area 740 may contain the individual's screen name, a link to the individual's profile, the server IP address where the individual is playing an online game, and common friends shared by the user and the individual.

A system may also include a graphical user interface for selecting options that may be accessible through the main graphical user interface 400 (e.g., under the Tools menu). FIG. 6 is an example of a graphical user interface 600 that may be generated by the client gaming program 108 for changing options. The interface 600 includes privacy options that allow a user to select the type of status information that the system provides for the user. As shown, a user may select to share (or not to share) his game status (i.e., which game(s) the user is playing) to friends and/or to friends of friends. The user can also select to share (or not to share) the identity of the game server on which the user is playing. The interface 600 may also allow a user to turn on/off sound for the client gaming program 108.

In this manner, the present invention provides a system and method for facilitating multiplayer online gaming. The system monitors and detects when certain individuals identified by a user are playing online games. The system notifies the user of the individuals currently playing games online, of games that the individuals are playing, and allows the user to easily join the games in progress.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

What is claimed is:

1. A system for facilitating multiplayer gaming over a computer network, the system comprising:
   a computer terminal configured with a client program and a second program;
   wherein the client program automatically detects when selected individuals are playing one or more multiplayer games on the computer network,
      notifies a user of the games and selected individuals playing the games,
      searches for and detects when one or more of the games are executing on the terminal, and
      communicates data identifying the running games and the user over the computer network for receipt by selected individuals;
   wherein the second program, which is separate from the games executing on the terminal, determines a connection status of the executing games and communicates the connection status to the client program; and
   wherein the client program communicates the connection status of the executing games over the computer network for receipt by the selected individuals.

2. The system of claim 1, wherein the client program assists the user in joining an individual in a game by running an instance of the game on the terminal and connecting the terminal to a location hosting the game.

3. The system of claim 1 wherein the second program comprises a layered service provider program.

4. The system of claim 1 wherein the connection status comprises an IP address hosting a corresponding game.

5. The system of claim 1 further comprising:
   one or more servers adapted to receive the data and connection status and to communicate the data and connection status to the selected individuals.

6. The system of claim 2 wherein the client program further generates a user interface that allows the user to join the individual in a game by selecting an icon.

7. The system of claim 2 wherein the program is further adapted to allow the user to send and receive instant messages to and from selected individuals.

8. The system of claim 7 wherein the selected individuals include individuals other than the user stored on a friend list created by the user.

9. The system of claim 8 wherein the selected individuals include individuals other than the user stored on a friend list created by an individual other than the user stored on a friend list created by the user.

10. A computerized method for facilitating multiplayer games over a computer network, comprising:
    searching for and detecting when one or more multiplayer games are executing on a user terminal;
    detecting when selected individuals are playing one or more of the multiplayer games on the computer network;
    notifying the user of the games and selected individuals playing the games;
    detecting, by a separate program, a connection status of the executing games; and
    communicating, by the separate program, data identifying the user, executing games and connection status to the selected individuals over the computer network; and
    assisting the user in joining an individual in a game by executing an instance of the game on the user terminal and connecting, based on the connection status, the user terminal to an address hosting the game.

11. The method of claim 10 wherein the connection status comprises an IP address hosting a corresponding game.

12. The method of claim 11 further comprising:
    sending and receiving instant messages between the user and the selected individuals.

13. The method of claim 12 wherein the selected individuals comprise first individuals contained on a list associated with the user.

14. The method of claim 13 wherein the selected individuals comprise second individuals included on a list, other than the user, associated with one or more of the first individuals.

15. A non-transitory computer-readable storage medium having computer-executable instructions for performing a method for facilitating multiplayer online gaming, the method comprising:
    searching for and detecting when one or more multiplayer games are running on a user terminal;
    detecting when selected individuals are playing one or more of the games on the computer network;
    notifying a user of the games and selected individuals playing the games;
    cause a second computer program to execute that determines a connection status of the executing games and communicates the connection status to the data processing apparatus; and
    assist the user in joining one of the selected individuals in a game by executing an instance of the game on the user terminal and connecting, based on the connection status, the user terminal to an address hosting the game.

16. The non-transitory computer-readable storage medium of claim 15, wherein the method further comprises:
    detecting a connection status of the executing games; and
    communicating data identifying the user, executing games and connection status to the selected individuals over the computer network.

17. The non-transitory computer-readable storage medium of claim 16, wherein the connection status comprises an IP address hosting a corresponding game.

18. The non-transitory computer-readable storage medium of claim 16, wherein the method further comprises:
    sending and receiving instant messages between the user and the selected individuals.

19. The non-transitory computer-readable storage medium of claim 18, wherein the selected individuals comprise first individuals included on a list chosen by the user.

20. The non-transitory computer-readable storage medium of claim 19, wherein the selected individuals comprise second individuals included on a list chosen by one or more of the first individuals.

21. A system for facilitating multiplayer gaming over a computer network, the system comprising:
a computer terminal configured with a client program and a second program;
wherein the client program automatically detects when selected individuals are playing one or more multiplayer games on the computer network,
notifies a user that the selected individuals are on the network and the games the selected individuals are playing,
searches the terminal's operating system processes to detect when one or more of the games are executing on the user's terminal and
communicates data identifying the executing games and the user over the computer network for receipt by selected individuals;
wherein the second program, which is not in communication with the games executing on the terminal, determines a connection status of the executing games and communicates the connection status to the client program; and
wherein the client program is further adapted to communicate the connection status of the executing games over the computer network to the selected individuals.

22. A non-transitory computer-readable storage medium having computer-executable instructions for performing a method for facilitating multiplayer online gaming, the method comprising:
automatically detecting when selected individuals are playing one or more multiplayer games on the computer network, and notifying a user that the selected individuals are on the network and the games the selected individuals are playing;
searching the terminal's operating system to detect when one or more of the games are executing on the user's terminal and communicating data identifying the executing games and the user over the computer network for receipt by selected individuals;
executing a second computer program that determines a connection status of the executing games and communicates the connection status to the data processing apparatus; and
communicating the connection status of the executing games over the computer network to the selected individuals.

23. The non-transitory computer-readable storage medium of claim 22 wherein the method further comprises assisting the user in joining one of the selected individuals in a game by executing an instance of the game on the user terminal and connecting, based on the connection status, the user terminal to an address hosting the game.

24. A non-transitory computer-readable storage medium having computer-executable instructions for facilitating multiplayer online gaming, comprising:
computer-executable instructions for searching for and detecting when one or more multiplayer games are running on a user terminal;
computer-executable instructions for detecting when selected individuals are playing one or more of the games on the computer network;
computer-executable instructions for notifying a user of the games and selected individuals playing the games;
computer-executable instructions to cause a second computer program to execute that determines a connection status of the executing games and communicates the connection status to the data processing apparatus; and
computer-executable instructions to assist the user in joining one of the selected individuals in a game by executing an instance of the game on the user terminal and connecting, based on the connection status, the user terminal to an address hosting the game.

25. The non-transitory computer-readable storage medium of claim 24, comprising:
computer-executable instructions for detecting a connection status of the executing games; and
computer-executable instructions for communicating data identifying the user, executing games and connection status to the selected individuals over the computer network.

26. The non-transitory computer-readable storage medium of claim 25, wherein the connection status comprises an IP address hosting a corresponding game.

27. The non-transitory computer-readable storage medium of claim 25, further comprising:
computer-executable instructions for sending and receiving instant messages between the user and the selected individuals.

28. The non-transitory computer-readable storage medium of claim 27, wherein the selected individuals comprise first individuals included on a list chosen by the user.

29. The non-transitory computer-readable storage medium of claim 28, wherein the selected individuals comprise second individuals included on a list chosen by one or more of the first individuals.

30. A non-transitory computer-readable storage medium having computer-executable instructions for performing a method for facilitating multiplayer online gaming, comprising:
computer-executable instructions for automatically detecting when selected individuals are playing one or more multiplayer games on the computer network, and notifying a user that the selected individuals are on the network and the games the selected individuals are playing;
computer-executable instructions for searching the terminal's operating system to detect when one or more of the games are executing on the user's terminal and communicating data identifying the executing games and the user over the computer network for receipt by selected individuals;
computer-executable instructions for executing a second computer program that determines a connection status of the executing games and communicates the connection status to the data processing apparatus; and
computer-executable instructions for communicating the connection status of the executing games over the computer network to the selected individuals.

31. The non-transitory computer-readable storage medium of claim 30, further comprising computer-executable instructions for assisting the user in joining one of the selected individuals in a game by executing an instance of the game on the user terminal and connecting, based on the connection status, the user terminal to an address hosting the game.

* * * * *